United States Patent [19]

Belter

[11] Patent Number: 4,817,967

[45] Date of Patent: Apr. 4, 1989

[54] ANGLED JUNCTION SEALING STRUCTURE FOR GASKETS

[75] Inventor: Jerome G. Belter, Mt. Prospect, Ill.

[73] Assignee: Dana Corporation, Toledo, Ohio

[21] Appl. No.: 131,951

[22] Filed: Dec. 11, 1987

[51] Int. Cl.[4] .............................................. F16J 15/10
[52] U.S. Cl. .................... 277/199; 277/207 R; 277/213; 277/215; 277/235 B; 123/198 E
[58] Field of Search ............... 277/192, 193, 195, 199, 277/207 R, 213, 215, 235 B; 123/198 E; 352/34, 35; 354/64

[56] References Cited

U.S. PATENT DOCUMENTS

| | | |
|---|---|---|
| 1,717,872 | 6/1929 | Brush et al. |
| 1,808,774 | 6/1931 | Hettinger |
| 1,921,266 | 8/1933 | Smith |
| 1,986,465 | 1/1935 | Dempsey .......................... 277/199 |
| 2,837,063 | 6/1958 | Martinez |
| 2,981,247 | 4/1961 | Gaebler |
| 2,988,081 | 6/1961 | Etchells et al. |
| 3,023,845 | 3/1962 | Kolbe |
| 3,036,506 | 5/1962 | Andresen .......................... 354/64 |
| 4,194,484 | 3/1980 | Kirchweger et al. |
| 4,375,323 | 3/1983 | Inagaki et al. .................... 354/64 |

FOREIGN PATENT DOCUMENTS 1367422  6/1964  France .......................... 277/235 B
2097070  10/1982  United Kingdom .......... 277/235 B Primary Examiner—Robert S. Ward
Attorney, Agent, or Firm—MacMillan, Sobanski & Todd

[57] ABSTRACT

A sealing structure for providing a relatively leak-proof seal between the junction of two gaskets which are disposed at an angle relative to one another is disclosed. A first gasket is interposed between two pieces of a first component of a vehicle engine or other device. When the two pieces are assembled together, the first component defines a surface adapted to mate with a corresponding surface formed on a second component of the device. An edge of the first gasket extends beyond the mating surface of the first component. The edge of the first gasket includes a plurality of outwardly extending projections formed integrally therewith. A second gasket is interposed between the mating surfaces of the first and second components. The second gasket includes a plurality of recesses formed in a face thereof, each of which corresponds to one of the projections formed in the first gasket. When the first and second components are assembled together, the projections formed on the edge of the first gasket extend into and engage the recesses formed in the face of the second gasket. The cooperation of the first and second gaskets prevents the formation of a flat surface abutment therebetween so as to provide a relatively leak-proof seal.

15 Claims, 2 Drawing Sheets

4,817,967

ANGLED JUNCTION SEALING STRUCTURE FOR GASKETS

BACKGROUND OF THE INVENTION

The present invention relates in general to gasket sealing mechanisms and in particular to a structure for providing a relatively leak-proof seal at the junction between two gaskets which are disposed at an angle relative to one another.

Gaskets are well known articles which are adapted to provide a relatively leak-proof seal between two mating components of a vehicle engine or other device. Typically, the two components include respective flat surfaces which are disposed adjacent to one another during use. A gasket is interposed between the mating surfaces of the two components and compressed therebetween so as to provide a relatively leak-proof seal. Many different structures are known in the art for gaskets of this type.

In some vehicle engines and other devices, one of the components is formed from two separate pieces. These two pieces must first be sealed together to form the first component before the first and second components can be sealed together. In order to accomplish this, a first gasket is initially interposed between the two pieces. The pieces are then secured together to compress the first gasket therebetween such that a relatively leak-proof seal is provided. When secured together, the two pieces and the first gasket form the first component. Any excess material of the first gasket extending beyond the mating surface of the first component is trimmed off to form as smooth a surface as possible. A second gasket is then interposed between the mating surfaces of the first component and the second component to form a seal as described above. In devices of this type, the first gasket is usually oriented at a right angle with respect to the second gasket such that a lower edge of the first gasket abuts an upper face of the second gasket. This angled junction between the first and second gaskets has been found to be susceptible to leakage because the abutment of the first gasket with the second gasket occurs along a generally flat surface.

SUMMARY OF THE INVENTION

The present invention relates to a sealing structure for providing a relatively leak-proof seal between the junction of two gaskets which are disposed at an angle relative to one another. A first gasket is interposed between two pieces of a first component of a vehicle engine or other device. When the two pieces are assembled together, the first component defines a surface adapted to mate with a corresponding surface formed on a second component of the device. A lower edge of the first gasket extends beyond the mating surface of the first component. The lower edge of the first gasket includes a plurality of outwardly extending projections formed integrally therewith. A second gasket is interposed between the mating surfaces of the first and second components. The second gasket includes a plurality of recesses formed in an upper face thereof, each of which corresponds to one of the projections formed in the first gasket. When the first and second components are assembled together, the projections formed on the lower edge of the first gasket extend into and engage the recesses formed in the upper face of the second gasket. The cooperation of the first and second gaskets prevents the formation of a flat surface abutment therebetween so as to provide a relatively leak-proof seal.

It is an object of the present invention to provide an angled junction sealing structure for establishing a relatively leak-proof seal at the junction between two gaskets which are disposed at an angle relative to one another.

It is another object of the present invention to provide such an angled junction sealing structure which is relatively simple and inexpensive in construction.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
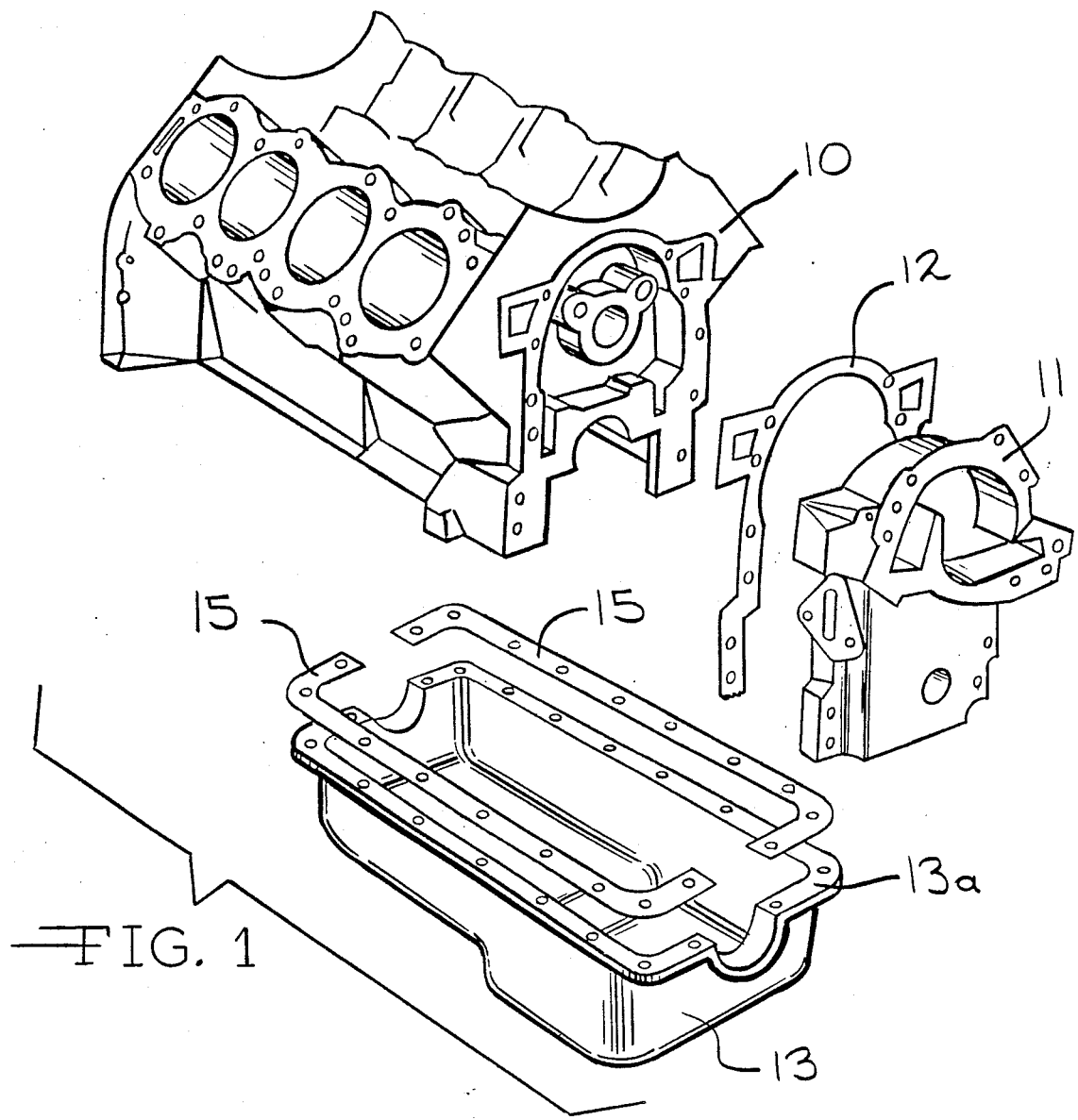
FIG. 1 is an exploded perspective view of a portion of a vehicle engine including an angled junction sealing structure in accordance with the present invention.

Referring now to the drawings, there is illustrated in FIG. 1 an exploded perspective view of portion of a conventional vehicle engine. Although the present invention will be described and illustrated in the context of the vehicle engine, it will be appreciated that other environments are contemplated to be within the scope thereof. An engine block 10 and a front cover 11 are provided which are adapted to be secured together by any conventional means. Vertically extending mating flat surfaces are formed on both the engine block 10 and the front cover 11 for this purpose. A first gasket 12 is vertically interposed between the engine block 10 and the front cover 11. When the engine block 10 and the front cover 11 are secured together, the first gasket 12 is compressed therebetween by the mating surfaces to form a relatively leak-proof seal, in a manner which is well known in the art. The engine block 10 and the front cover 11 represent two pieces of the vehicle engine which, when secured together, form a first component thereof. A generally flat horizontally extending mating surface is defined along the bottom of the first component when the engine block 10 and the front cover 11 are secured together.

Figure 2:
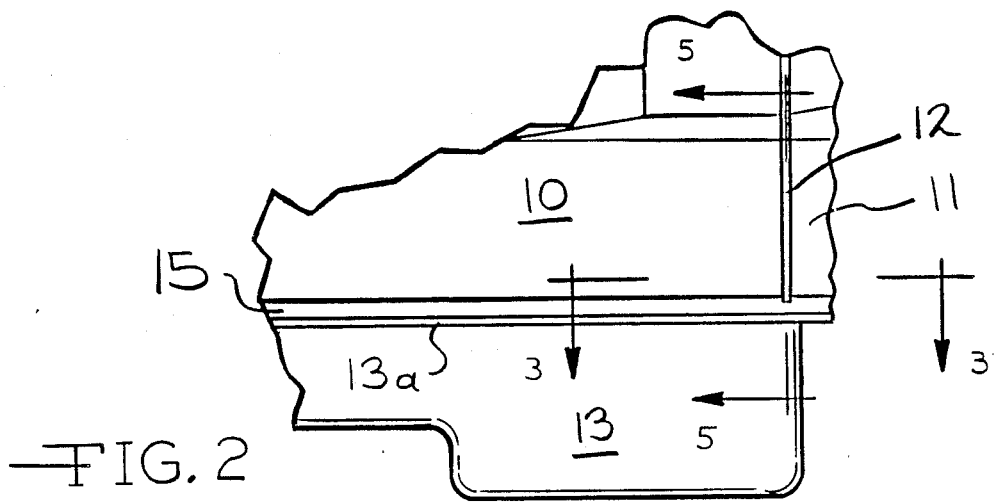
FIG. 2 is an enlarged fragmentary elevational view of the vehicle engine illustrated in FIG. 1 after assembly.

An oil pan 13 forms a second component of the vehicle engine. The oil pan 13 includes an upper lip portion 13a extending about the most of the periphery thereof. A generally flat horizontally extending mating surface is defined along the upper surface of the lip portion 13a which corresponds to the horizontally extending mating surface defined along the bottom of the first component. After the engine block 10 and the front cover 11 have been secured together to form the first component as described above, the oil pan 13 can be secured thereto by any conventional means. A second gasket 15 (illustrated in two sections) is horizontally interposed between the mating horizontally extending surfaces of the first and second components and compressed to form a relatively leak-proof seal, in a manner which will be described in detail below. FIG. 2 illustrates the vehicle engine after the engine block 10, the front cover 11, and the oil pan 13 have been assembled together with the first and second gaskets 12 and 15. As shown therein, a lower edge of the first gasket 12 extends below the bottom mating surface of the first component into abutment with an upper face of the second gasket at approximately a ninety degree angle.

Figure 3:
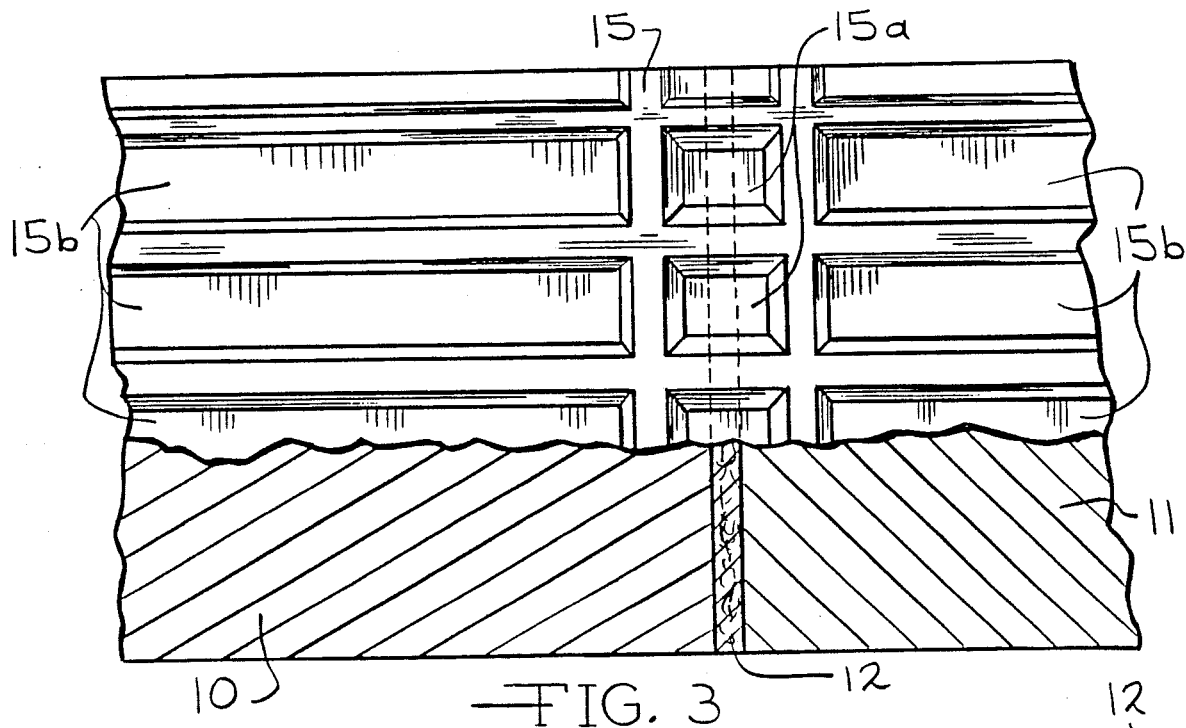
FIG. 3 is a sectional top plan view, partially broken away, taken along line 3—3 of FIG. 2.
Figure 4:
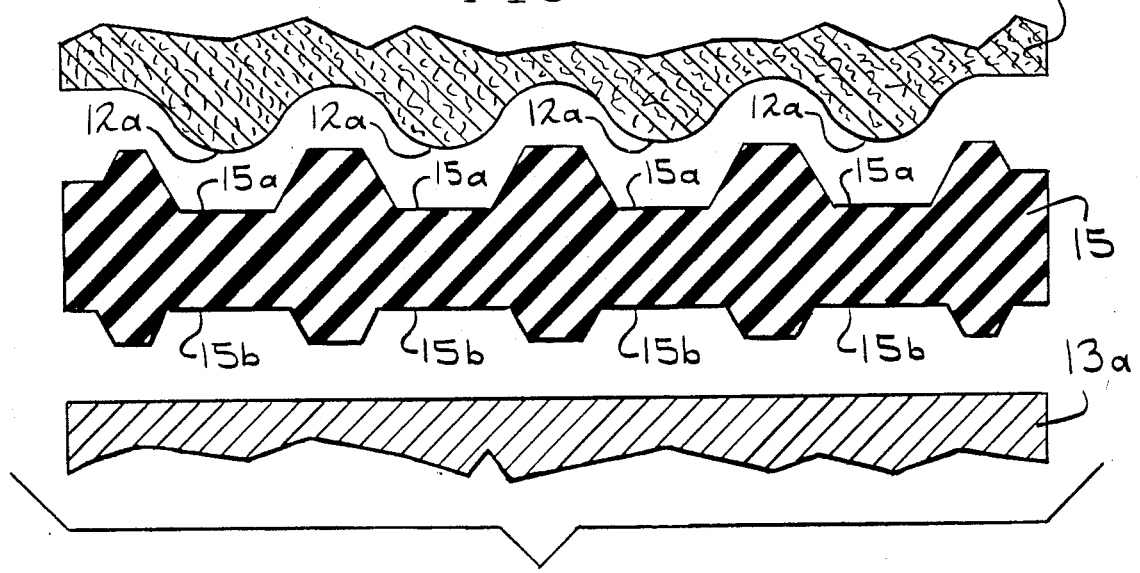
FIG. 4 is an exploded sectional elevational view of the angled junction sealing structure illustrated in FIG. 5.
Figure 5:
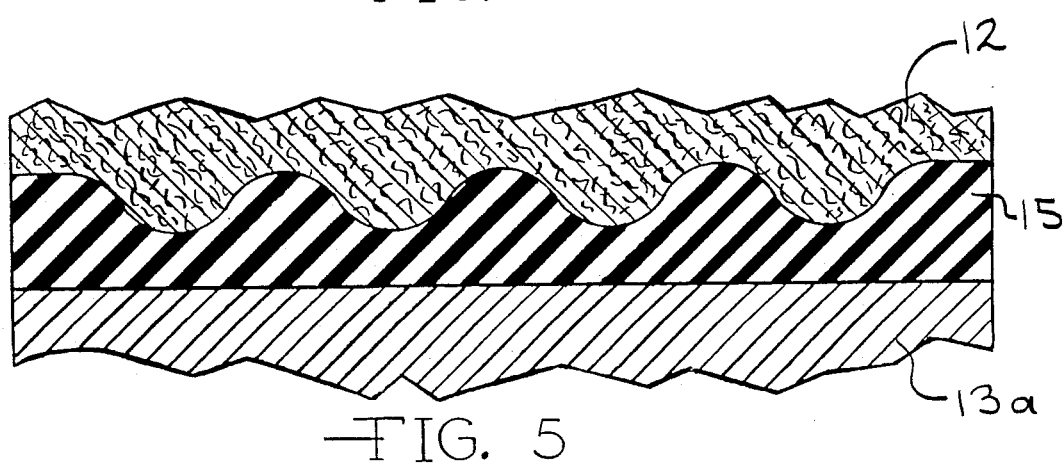
FIG. 5 is a sectional elevational view, partially broken away, taken along line 5—5 of FIG. 2.

The structures of the first and second gaskets 12 and 15 are illustrated more clearly in FIGS. 3 through 5. As shown therein, the first gasket 12 is disposed between the engine block 10 and the front cover 11. The first gasket may be formed from any conventional compressed sheet packing material, and may specifically be formed from a combined rubber and asbestos fibrous material. The first gasket 12 may be approximately 0.0625 inch in thickness. As best shown in FIG. 4, the lower edge of the first gasket 12 is formed having a plurality of curved projections 12a. In the illustrated embodiment, four of such projections 12a are formed integrally with the first gasket 12. These projections 12a may, for example, be formed when the first gasket 12 is stamped from a blank (not shown) of the fibrous material and may extend approximately 0.044 inch from the lower edge thereof.

The second gasket 15 may be formed from any conventional elastomeric material, such as rubber. As best shown in FIG. 4, the upper face of the second gasket 15 is formed having a plurality of recesses 15a. In the illustrated embodiment, four of such recesses 15a are formed across the upper face of the second gasket 15. The recesses 15a are defined by flat angled side wall portions which terminate in flat bottom portions. The side wall portions of the recesses 15a may be angled inwardly at approximately a thirty degree angle, while the depth of the bottom portions thereof may be 0.044 inch. The size of the recesses 15a may be formed approximately 0.150 inch by 0.100 inch. Preferably, the number of the recesses 15a corresponds to the number of the projections 12a. If desired, other recessed areas 15b may be formed in both the upper and lower faces of the second gasket 15. It will be appreciated that the other recessed areas 15b of the second gasket 15 do not extend into the area of the angled junction between the first gasket 12 and the second gasket 15.

The projections 12a and the recesses 15a are aligned with one another such the projections 12a are received within the recesses 15a when the second component of the vehicle engine (the oil pan 13) is secured to the first component (the engine block 10 and the front cover 11), as shown in FIGS. 3 and 5. When so secured, the second gasket 15 is compressed therebetween. Because it is formed from an elastomeric material, the second gasket 15 is deformed as a result of such compression. The upper face of the second gasket 15 conforms about the projections of the first gasket 12, while the lower face of the second gasket 15 conforms to the flat horizontally extending mating surface of the lip portion 13a of the oil pan.

As a result of the cooperation between the first and second gaskets 12 and 15, a serpentine engagement surface is created along the angled junction therebetween. This serpentine engagement surface provides a better seal between the first and second gaskets 12 and 15 than would otherwise occur if such surface was flat. Even though a better seal is provided thereby, the first and second gaskets 12 and 15 are not significantly more expensive to produce than conventional gaskets now in use. Additionally, the nature of the cooperation between the first and second gaskets 12 and 15 does not require that unusual precautions be taken to insure precise size tolerances of the projections 12a or of the recesses 15a. The gaskets 12 and 15 of the present invention have been found to function satisfactorily when formed using normal manufacturing practices now in use for conventional gaskets.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. An angled junction sealing structure comprising:
   a first gasket including an edge having at least one projection formed therein, said projection extending in a first plane; and
   a second gasket including a face engaged by said edge of said first gasket, said face extending in a second plane disposed at an angle relative to said first plane and including at least one recess formed therein which receives said projection.

2. The invention defined in claim 1 wherein a plurality of said projections are formed integrally with said edge of said first gasket and wherein said projections are received in a corresponding plurality of recesses formed in said face of said second gasket.

3. The invention defined in claim 2 wherein four of said projections are formed with said first gasket and wherein four of said recesses are formed in said second gasket.

4. The invention defined in claim 1 wherein said first gasket is formed from a compressed sheet packing material.

5. The invention defined in claim 1 wherein said second gasket is formed from an elastomeric material.

6. The invention defined in claim 1 wherein said projection is curved in shape.

7. The invention defined in claim 1 wherein said recess is defined by a plurality of flat angled side wall portions which terminate in a flat bottom portion.

8. In a vehicle engine including first and second pieces adapted to be secured together to form a first component and a second component adapted to be secured to the first component, an angled junction sealing structure comprising:
   a first gasket interposed between the first and second pieces, said first gasket including an edge having at least one projection formed therein, said projection extending in a first plane; and
   a second gasket interposed between the first and second components, said second gasket including a face engaged by said edge of said first gasket, said face extending in a second plane disposed at an angle relative to said first plane and including at least one recess formed therein which receives said projection.

9. The invention defined in claim 8 wherein a plurality of said projections are formed integrally with said edge of said first gasket and wherein said projections are received in a corresponding plurality of recesses formed in said face of said second gasket.

10. The invention defined in claim 9 wherein four of said projections are formed with said first gasket and wherein four of said recesses are formed in said second gasket.

11. The invention defined in claim 8 wherein said first gasket is formed from a compressed sheet packing material.

12. The invention defined in claim 8 wherein said second gasket is formed from an elastomeric material.

13. The invention defined in claim 8 wherein said projection is curved in shape.

14. The invention defined in claim 8 wherein said recess is defined by a plurality of flat angled side wall portions which terminate in a flat bottom portion.

15. An angled junction sealing structure comprising:
a first gasket including an end portion having opposed faces adapted to be sealingly engaged between first and second pieces, said end portion terminating in an edge having at least one projection extending therefrom in a first plane; and
a second gasket including a face adapted to be sealingly engaged by the first and second pieces and said end portion of said first gasket, said face extending in a second plane disposed at an angle relative to said first plane and including at least one recess formed therein which receives said projection.

* * * * *